(12) United States Patent
Sinnadurai et al.

(10) Patent No.: US 9,996,652 B2
(45) Date of Patent: Jun. 12, 2018

(54) INCREMENTAL REGISTER RETIMING OF AN INTEGRATED CIRCUIT DESIGN

(71) Applicant: Altera Corporation, San Jose, CA (US)

(72) Inventors: Nishanth Sinnadurai, Scarborough (CA); Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 69 days.

(21) Appl. No.: 14/846,645

(22) Filed: Sep. 4, 2015

(65) Prior Publication Data

US 2017/0068765 A1    Mar. 9, 2017

(51) Int. Cl.
*G06F 9/455* (2018.01)
*G06F 17/50* (2006.01)

(52) U.S. Cl.
CPC ...... *G06F 17/5072* (2013.01); *G06F 17/5054* (2013.01); *G06F 17/5081* (2013.01); *G06F 2217/84* (2013.01)

(58) Field of Classification Search
CPC ............. G06F 17/5031; G06F 2217/84; G06F 17/5072; G06F 17/5081; G06F 17/5054
See application file for complete search history.

(56) References Cited

U.S. PATENT DOCUMENTS

| 7,120,083 | B2 | 10/2006 | Ko | |
|---|---|---|---|---|
| 7,120,883 | B1 * | 10/2006 | van Antwerpen | .. G06F 17/5054 716/102 |
| 7,337,100 | B1 * | 2/2008 | Hutton | ............... G06F 17/5068 703/13 |
| 7,360,190 | B1 * | 4/2008 | Singh | .................. G06F 17/5072 716/113 |

(Continued)

OTHER PUBLICATIONS

Singh et al., "Incremental Retiming for FPGA Physical Synthesis", Proceedings 42nd Design Automation Conference, Anaheim, CA, USA, Jun. 13-17, 2005, Jun. 13, 2005 (Jun. 13, 2005), pp. 433-438, XP010837248, DOI: 10.1109/DAC.2005.193848 ISBN: 978-1-59593-058-3.

*Primary Examiner* — Nha Nguyen
(74) *Attorney, Agent, or Firm* — Tianyi He

(57) ABSTRACT

A first circuit design description may have registers and combinational gates. Circuit design computing equipment may perform register retiming on the first circuit design description, whereby registers are moved across combinational gates during a first circuit design implementation. An engineering-change-order (ECO) of the first circuit design may result in a second circuit design. The differences between the first and second circuit designs may be confined to a region-of-change. The circuit design computing equipment may preserve the results from the first circuit design implementation and re-use portions of these results during the implementation of the second circuit design. For example, the circuit design computing equipment may pre- (Continued)

serve the register retiming solution from the first circuit design implementation for portions of the second circuit design that are outside the region-of-change and incrementally create graphs that allow to incrementally solve the register retiming problem during the second circuit design implementation.

13 Claims, 13 Drawing Sheets

(56) References Cited

U.S. PATENT DOCUMENTS

| | | | |
|---|---|---|---|
| 7,657,855 B1 * | 2/2010 | Manaker, Jr. | G06F 17/5031 716/103 |
| 7,689,955 B1 | 3/2010 | van Antwerpen et al. | |
| 7,945,880 B1 * | 5/2011 | Albrecht | G06F 17/5031 716/101 |
| 8,281,274 B1 * | 10/2012 | Padalia | G06F 17/5022 716/116 |
| 8,296,695 B1 * | 10/2012 | Chen | G06F 17/505 703/16 |
| 8,381,142 B1 * | 2/2013 | Hutton | G06F 17/5054 716/100 |
| 8,438,511 B1 * | 5/2013 | Hurst | G06F 17/505 716/104 |
| 8,539,418 B1 * | 9/2013 | Padalia | G06F 17/5022 716/121 |
| 8,813,001 B2 | 4/2014 | Zhou et al. | |
| 8,732,634 B1 | 5/2014 | Chen et al. | |
| 8,806,399 B1 | 8/2014 | van Antwerpen et al. | |
| 8,863,067 B1 * | 10/2014 | Caldwell | G06F 17/5081 716/132 |
| 9,529,947 B1 * | 12/2016 | Chiu | G06F 17/5031 |
| 9,569,574 B1 * | 2/2017 | Khan | G06F 17/505 |
| 2002/0023252 A1 * | 2/2002 | Lee | G06F 17/5031 716/113 |
| 2005/0066296 A1 * | 3/2005 | Visweswariah | G06F 17/5031 716/108 |
| 2005/0132316 A1 | 6/2005 | Suaris et al. | |
| 2005/0289498 A1 * | 12/2005 | Sawkar | G06F 17/505 716/104 |
| 2008/0028347 A1 * | 1/2008 | Hiraoglu | G06F 17/504 716/103 |
| 2009/0007027 A1 * | 1/2009 | Hutchings | G06F 17/5054 716/132 |
| 2011/0161066 A1 * | 6/2011 | Kakkar | G06F 17/5022 703/15 |
| 2015/0186561 A1 * | 7/2015 | Teig | G06F 17/505 716/134 |

* cited by examiner

BASIC CONSTRAINTS (NON-NEGATIVE REGISTERS ON EDGE):
    w_ret(A,C) = w(A,C) + r(A) - r(C) >= 0   thus: r(C) - r(A) <= 1
    w_ret(B,D) = w(B,D) + r(B) - r(D) >= 0   thus: r(D) - r(B) <= 1
    w_ret(C,E) = w(C,E) + r(C) - r(E) >= 0   thus: r(E) - r(C) <= 0
    w_ret(D,E) = w(D,E) + r(D) - r(E) >= 0   thus: r(E) - r(D) <= 0
    w_ret(E,F) = w(E,F) + r(E) - r(F) >= 0   thus: r(F) - r(E) <= 2

TIMING CONSTRAINTS (BASED ON TIMING ANALYSIS):
    w_ret(C,E) = w(C,E) + r(C) - r(E) >= 1   thus: r(E) - r(C) <= -1
    w_ret(D,E) = w(D,E) + r(D) - r(E) >= 1   thus: r(E) - r(D) <= -1

ARCHITECTURE CONSTRAINTS (BASED ON ROUTING REGISTERS):
    w_ret(A,C) = w(A,C) + r(A) - r(C) <= 1   thus: r(A) - r(C) <= 0
    w_ret(B,D) = w(B,D) + r(B) - r(D) <= 1   thus: r(B) - r(D) <= 0
    w_ret(C,E) = w(C,E) + r(C) - r(E) <= 1   thus: r(C) - r(E) <= 1
    w_ret(D,E) = w(D,E) + r(D) - r(E) <= 1   thus: r(D) - r(E) <= 1
    w_ret(E,F) = w(E,F) + r(E) - r(F) <= 1   thus: r(E) - r(F) <= -1

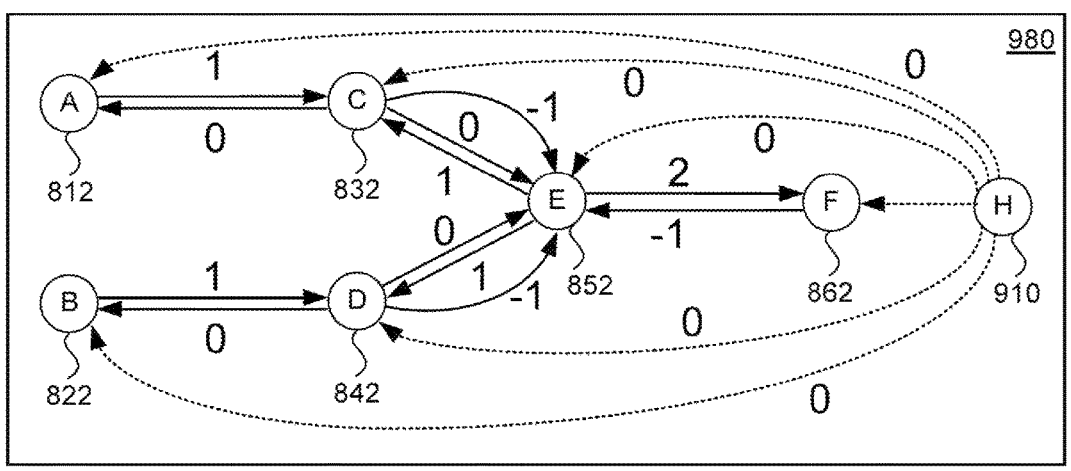

FIG. 9

INCREMENTAL REGISTER RETIMING OF AN INTEGRATED CIRCUIT DESIGN

BACKGROUND

This relates to integrated circuits and, more particularly, to performing incremental register retiming of an integrated circuit design.

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, which have led to performance increases.

To further increase the performance, solutions such as register retiming have been proposed, where registers are moved among portions of combinational logic, thereby achieving a more balanced distribution of delays between registers and thus potentially a higher clock frequency at which the integrated circuit may be operated.

Register retiming is often performed when delays between registers are well known. For example, register retiming may be performed after physical design operations such as placement and routing have been performed on the integrated circuit design.

Occasionally, the integrated circuit design may change, for example as the result of a change in the specification or as the result of an error that was located late in the design cycle. Such changes to the integrated circuit design may require a full iteration through the physical design operations and the register retiming operation.

It is within this context that the embodiments herein arise.

SUMMARY

In accordance with certain aspects of the invention, a circuit design computing equipment may receive a first circuit design and a first circuit design implementation that is at least partially generated as a result of a register retiming operation. The circuit design computing equipment may further receive a second circuit design that is the result of an engineering-change-order of the first circuit design, identify differences between the first circuit design and the second circuit design, and perform a compilation of the second circuit design to generate a second circuit design implementation. The compilation may include an incremental register retiming operation that is based on the identified differences between the first and second circuit designs and the result of the register retiming operation.

It is appreciated that the present invention can be implemented in numerous ways, such as a process, an apparatus, a system, a device, or a method on a computer readable medium. Several inventive embodiments of the present invention are described below.

In certain embodiments, the above-mentioned circuit design computing equipment may, for the purpose of identifying differences between the first circuit design and the second circuit design, identify a first region of the first circuit design that has a predetermined functionality and identify a second region of the second circuit design that has the same predetermined functionality.

If desired, the circuit design computing equipment may further identify a third region of the first circuit design that is coupled to the first region and a fourth region of the second circuit design that is coupled to the second region.

Further features of the invention, its nature and various advantages, will be more apparent from the accompanying drawings and the following detailed description of the preferred embodiments.

BRIEF DESCRIPTION OF THE DRAWINGS

FIG. 9 is a diagram of illustrative constraints and a corresponding constraint graph in accordance with an embodiment.

DETAILED DESCRIPTION

The present embodiments relates to integrated circuits and, more particularly, to performing incremental register retiming of an integrated circuit design.

Computer-Aided Design (CAD) tools may compile a circuit design to generate a circuit design implementation. Such a circuit design implementation may include a bitstream for configuring a programmable logic device (PLD), a simulation netlist, timing constraints, timing analysis results, power analysis results, a placement netlist, a routing netlist, a register retiming dependency graph, a mask set for an integrated circuit, an integrated circuit, just to name a few.

During the compilation, the CAD tool may perform operations such as placement, routing, and register retiming. Occasionally, the circuit design may change, for example as the result of a change in the specification, as the result of an error that was located late in the design cycle, or through a register pipelining operation that is performed for example after routing operations and increases the number of registers on selected paths to improve performance. Such a change to the circuit design, which is sometimes also referred to as an engineering-change-order (ECO), may require a compilation of the modified circuit design from scratch. Such a full iteration through the placement, routing, and register retiming operations may result in a circuit design implementation that no longer meets timing requirements, thereby starting a lengthy timing closure process all over again.

It may therefore be desirable to preserve portions of the original integrated circuit implementation and to update only the portions of the original integrated circuit implementation that are affected by the ECO during the compilation of the modified circuit design. A compilation that preserves portions of a first integrated circuit implementation and that updates only the portions of the original integrated circuit implementation that are affected by an ECO is sometimes also referred to as an incremental compilation or an incremental compile. Operations that are performed during an incremental compilation and that update only the portions of the original integrated circuit implementation that are affected by the ECO are also sometimes referred to as being incremental (e.g., incremental logic synthesis, incremental technology mapping, incremental physical synthesis, incremental clustering, incremental placement, incremental routing, incremental retiming, etc.)

It will be recognized by one skilled in the art, that the present exemplary embodiments may be practiced without some or all of these specific details. In other instances, well-known operations have not been described in detail in order not to unnecessarily obscure the present embodiments.

Figure 1:
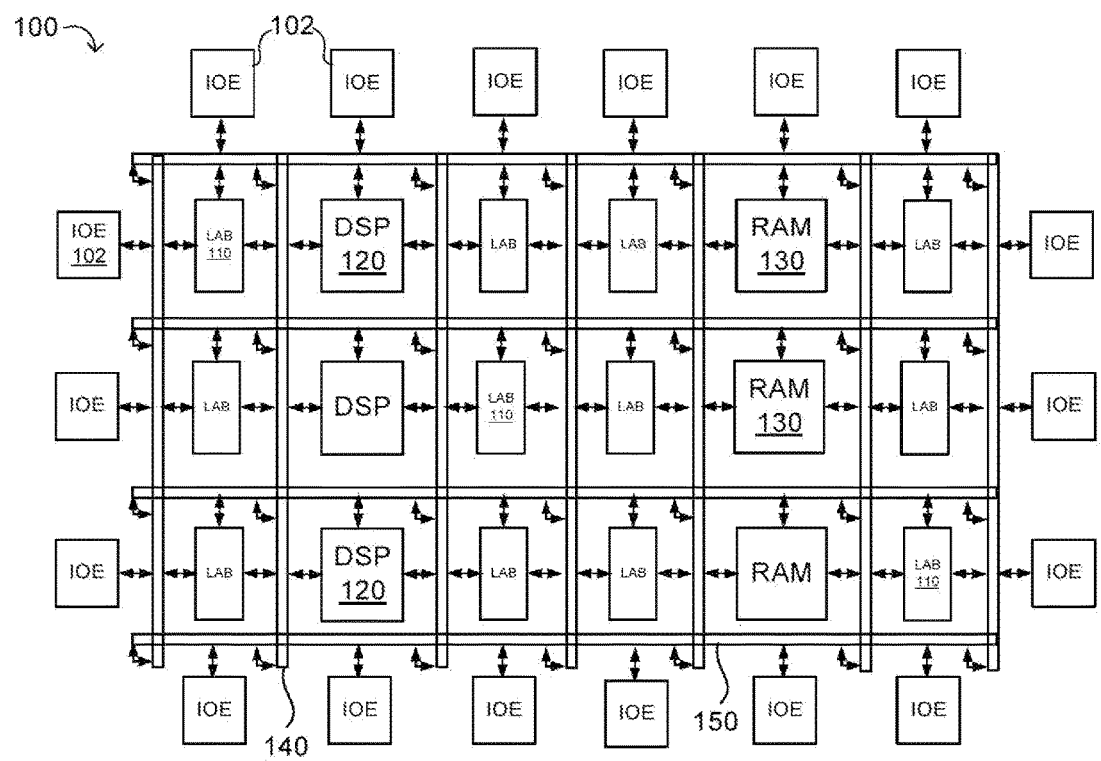
FIG. 1 is a diagram of an illustrative integrated circuit in accordance with an embodiment.

An illustrative embodiment of an integrated circuit such as programmable logic device (PLD) 100 that may be configured to implement a circuit design is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input/output elements (ICEs) 102. Once loaded, the memory elements each provide a corresponding static control signal that controls the operation of an associated functional block (e.g., LABs 110, DSP 120, RAM 130, or input/output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), or programmable memory elements.

In addition, the programmable logic device may have input/output elements (IOEs) 102 for driving signals off of PLD and for receiving signals from other devices. Input/output elements 102 may include parallel input/output circuitry, serial data transceiver circuitry, differential receiver and transmitter circuitry, or other circuitry used to connect one integrated circuit to another integrated circuit. As shown, input/output elements 102 may be located around the periphery of the chip. If desired, the programmable logic device may have input/output elements 102 arranged in different ways. For example, input/output elements 102 may form one or more columns of input/output elements that may be located anywhere on the programmable logic device (e.g., distributed evenly across the width of the PLD). If desired, input/output elements 102 may form one or more rows of input/output elements (e.g., distributed across the height of the PLD). Alternatively, input/output elements 102 may form islands of input/output elements that may be distributed over the surface of the PLD or clustered in selected areas.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns.

Figure 2:
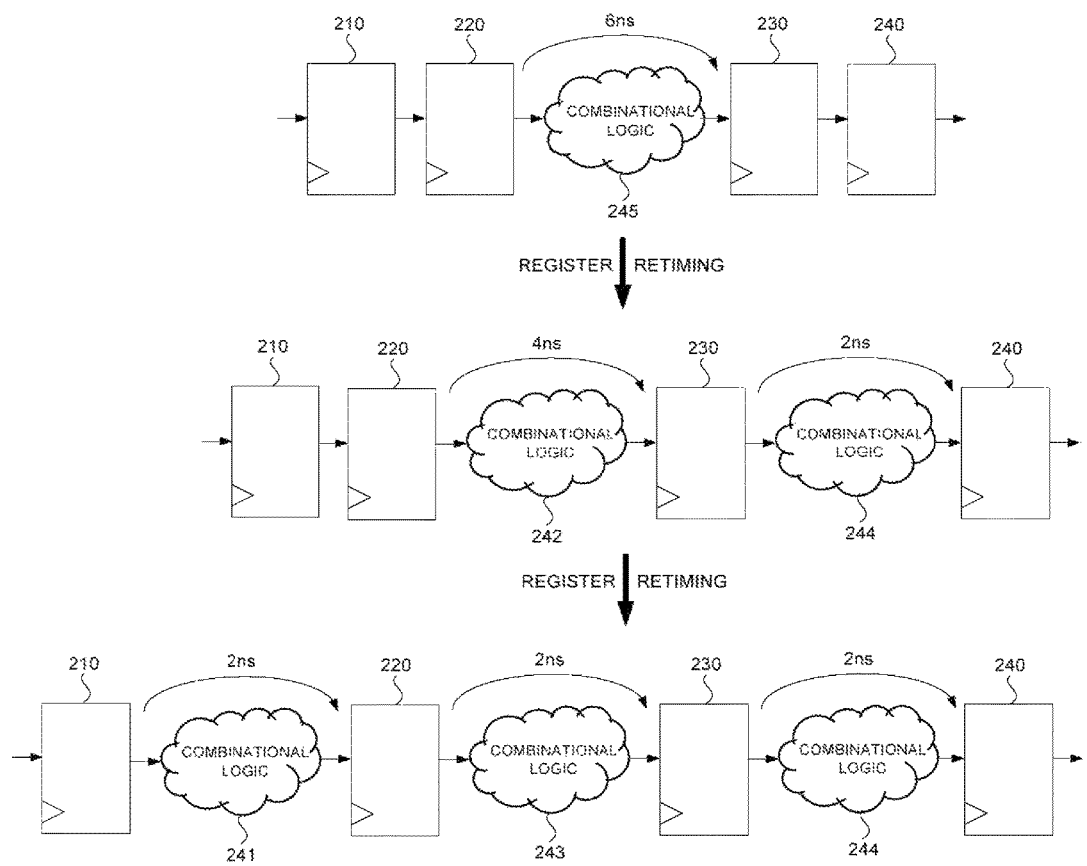
FIG. 2 is a diagram of illustrative retiming operations in accordance with an embodiment.

FIG. 2 shows an example of different versions of a circuit design that PLD 100 may implement. The first version of the circuit design may include registers 210, 220, 230, and 240 and combinational logic 245. Register 210 may send a signal to register 220; register 220 may send the signal through combinational logic 245 to register 230; and register 230 may send the signal to register 240. As an example, the delay on the path from register 220 through combinational logic 245 to register 230 may have a delay of 6 ns (nanoseconds), whereas the delay between register 210 and 220 and between registers 230 and 240 may have a delay of 0 ns.

Thus, the first version of the circuit design may operate at a frequency of 166 MHz (megahertz).

Performing register retiming on the first version of the circuit design may create the second version of the circuit design. For example, register 230 may be pushed back through a portion of combinational logic 245, thereby separating combinational logic 245 of the first version of the circuit design into combinational logic 242 and 244 of the second version of the circuit design. In the second version of the circuit design, register 210 may send a signal to register 220; register 220 may send the signal through combinational logic 242 to register 230; and register 230 may send the signal through combinational logic 244 to register 240.

As an example, the delay on the path from register 220 through combinational logic 242 to register 230 may have a delay of 4 ns, and the delay from register 230 through combinational logic 244 to register 240 may have a delay of 2 ns. Thus, the second version of the circuit design may operate at a frequency of 250 MHz.

Performing register retiming on the second version of the circuit design may create the third version of the circuit design. For example, register 220 may be pushed forward through a portion of combinational logic 242, thereby separating combinational logic 242 of the second version of the circuit design into combinational logic 241 and 243 of the third version of the circuit design. In the third version of the circuit design, register 210 may send a signal through combinational logic 241 to register 220, register 220 may send the signal through combinational logic 243 to register 230, and register 230 may send the signal through combinational logic 244 to register 240.

As an example, the delay on the paths from register 210 through combinational logic 241 to register 220, from register 220 through combinational logic 243 to register 230, and from register 230 through combinational logic 244 to register 240 may all have a delay of 2 ns. Thus, the third version of the circuit design may operate at a frequency of 500 MHz, which is thrice the frequency at which the first version of the circuit design may operate.

Figure 3:
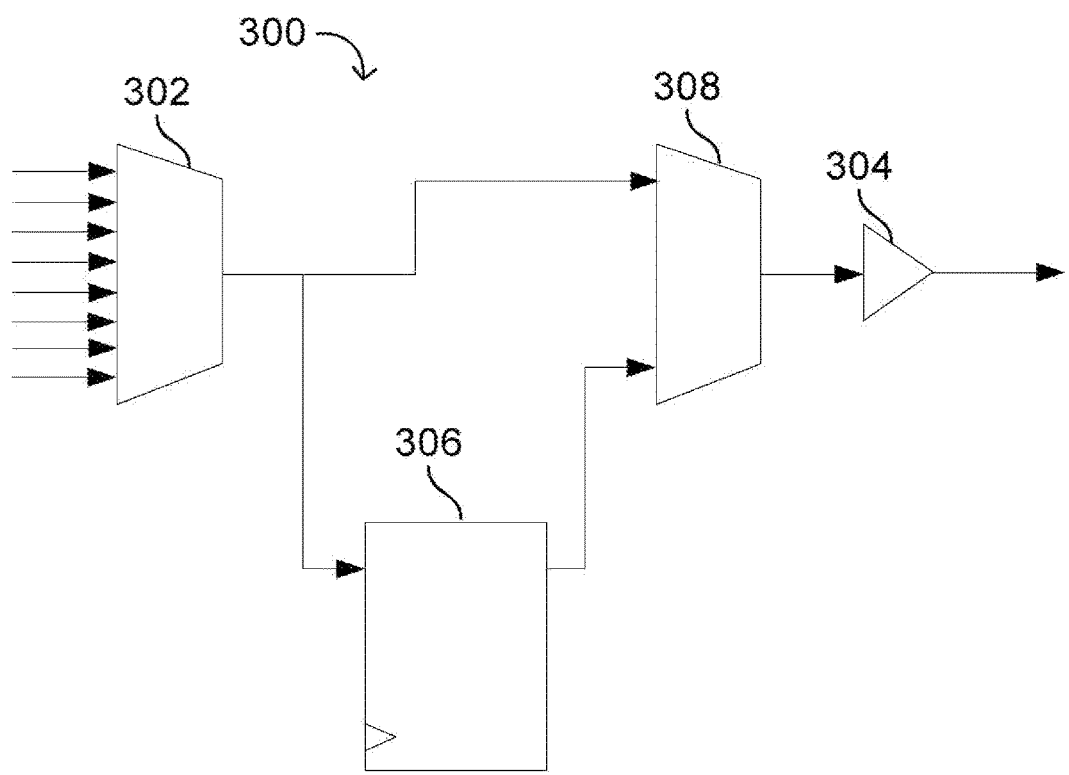
FIG. 3 is a diagram of an illustrative pipelined routing resource which uses a register to pipeline a routing signal in accordance with an embodiment.

If desired, routing resources such as the vertical routing channels 140 or the horizontal routing channels 150 of FIG. 1 may include pipeline elements, which can facilitate register retiming. FIG. 3 depicts a pipelined routing resource 300 which uses a register in accordance with an embodiment. As shown, the pipelined routing resource 300 includes a first multiplexer 302, a driver 304, a register 306, and a second multiplexer 308.

Multiplexer 302 may be a driver input multiplexer (DIM) or a functional block input multiplexer (FBIM). A DIM may select a signal from multiple sources and send the selected signal to driver 304 that drives the wire. The multiple sources may include signals from outputs of functional blocks and other routing wires that travel in the same or in an orthogonal direction to the wire. A FBIM outputs a signal to a functional block and may select the signal from multiple routing wires.

As shown in FIG. 3, in accordance with an embodiment of the invention, the multiplexer 302 may be pipelined by providing its output to the data input of register 306. Multiplexer 308 in the pipelined routing resource 300 may receive the output of multiplexer 302 directly and may also receive the data output from register 306.

Although the pipelined routing resource 300 includes a register, it will be recognized by one skilled in the art that different register implementations may be used to store a routing signal such as an edge-triggered flip-flop, a pulse latch, a transparent-low latch, a transparent-high latch, just to name a few. Thus, in order not to unnecessarily obscure the present embodiments, we refer to the storage circuit in the pipelined routing resource as a pipeline storage element.

Multiplexer 308 may enable the pipelined routing resource 300 to be either used in a non-pipeline mode or in a pipeline register mode. In the non-pipeline mode, the output of multiplexer 308 selects the direct output of multiplexer 302.

In the pipeline mode, multiplexer 308 may select the output of register 306. Multiplexer 308 may provide its output to driver circuit 304, and the output of driver circuit 304 may be used to drive a routing wire. The routing wire may span multiple functional blocks (e.g., for a pipelined routing resource with a DIM). Alternatively, the routing wire may be inside a functional block (e.g., for a pipelined routing resource with a FBIM).

Every DIM/FBIM may include a register such as register 306 such that all the routing multiplexers are pipelined. However, in some embodiments, that may be unnecessary as the capabilities provided may exceed design requirements. Thus, in certain embodiments only a fraction, such as one-half or one-fourth, of the routing multiplexers may be pipelined. For example, a signal may take 150 picoseconds (ps) to traverse a wire of a given length, but a clock signal may be constrained to operate with a 650 ps clock cycle. Thus, providing a pipeline register such as register 306 every fourth wire may be sufficient in this example. Alternatively the registers may be placed more frequently than every fourth wire (e.g., every second wire) to provide a higher degree of freedom in selection of which registers are used.

Pipelined routing resources such as pipelined routing resource 300 may facilitate register retiming operations, such as the register retiming illustrated in FIG. 2. For example, consider the scenario in which register 230 is implemented by a first instance of a pipelined routing element that is operated in pipeline register mode (i.e., register 230 is implemented by register 306 of a first instance of a pipelined routing resource 300). Consider further that the path from register 220 through combinational logic 245 to register 230 includes a second instance of a pipelined routing element that is operated in non-pipeline mode. Thus, switching the first instance of the pipelined routing element from operating in pipeline register mode to operating in non-pipeline mode and switching the second instance of the pipelined routing element from operating in non-pipeline mode to operating in pipeline register mode may transform the first version into the second version of the circuit design presented in FIG. 2.

CAD tools in a circuit design system may evaluate whether register retiming may improve the performance of a current version of a circuit design or whether the current version of the circuit design meets a given performance criterion. If desired, and in the event that the CAD tools determine that register retiming would improve the performance of the current version of the circuit design or that the current version of the circuit design misses the given performance criterion, the CAD tools may execute register retiming operations that transform the current version of the circuit design into another version of the circuit design (e.g., as illustrated in FIG. 2).

Figure 4:
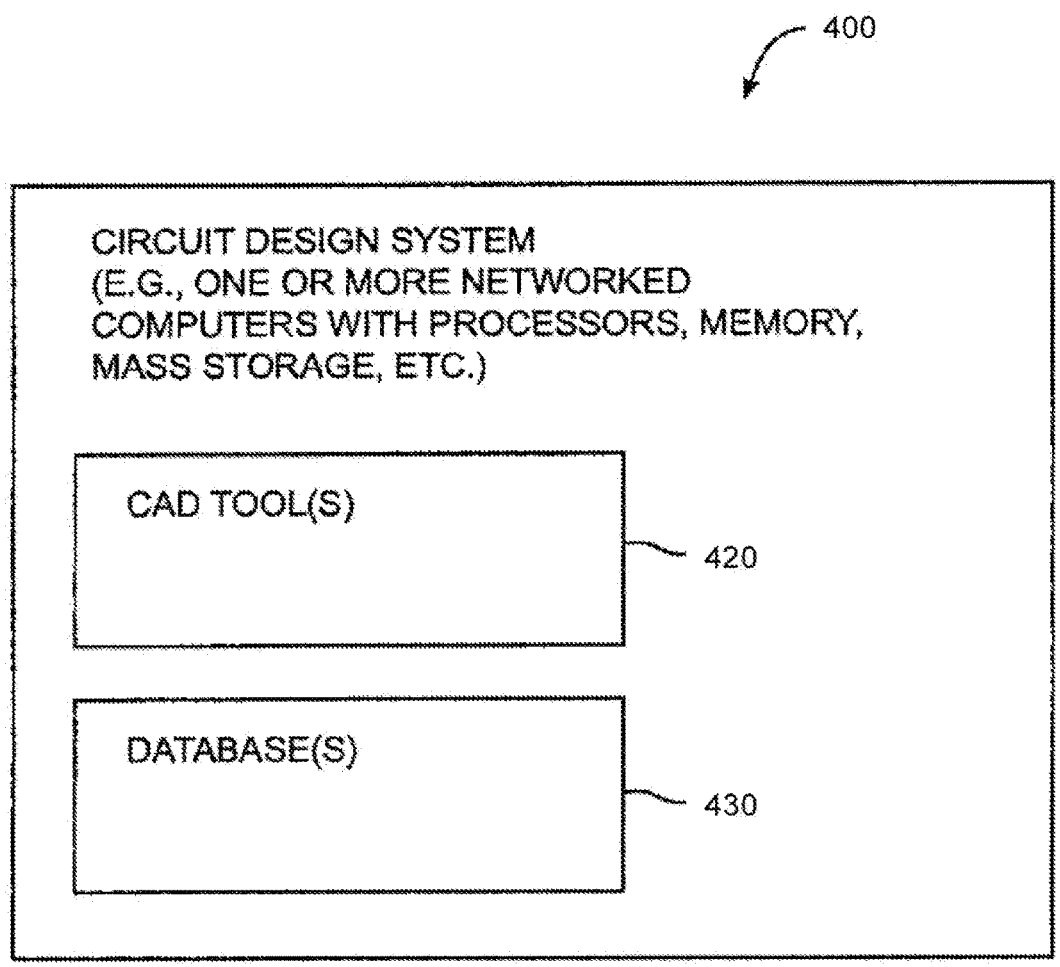
FIG. 4 is a diagram of a circuit design system that may be used to design integrated circuits in accordance with an embodiment.

An illustrative circuit design system 400 in accordance with an embodiment is shown in FIG. 4. System 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 400 is installed, the storage of system 400 has instructions and data that cause the computing equipment in system 400 to execute various methods (processes). When performing these processes, the computing equipment is configured to implement the functions of the circuit design system.

The computer aided design (CAD) tools 420, some or all of which are sometimes referred to collectively as a CAD tool or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools during the execution of successive operations or by the same tools for successive iterations of the same operation. For example, a first tool may store data for a second tool in a shared database. The second tool may access the shared database to retrieve the data stored by the first tool. This allows one tool to pass information to another tool. As another example, the first and second tools may store data in a shared database and a successive iteration through the first and second tools may access the stored information for the purpose of performing incremental operations. Tools may also pass information between each other without storing information in a shared database if desired.

Figure 5:
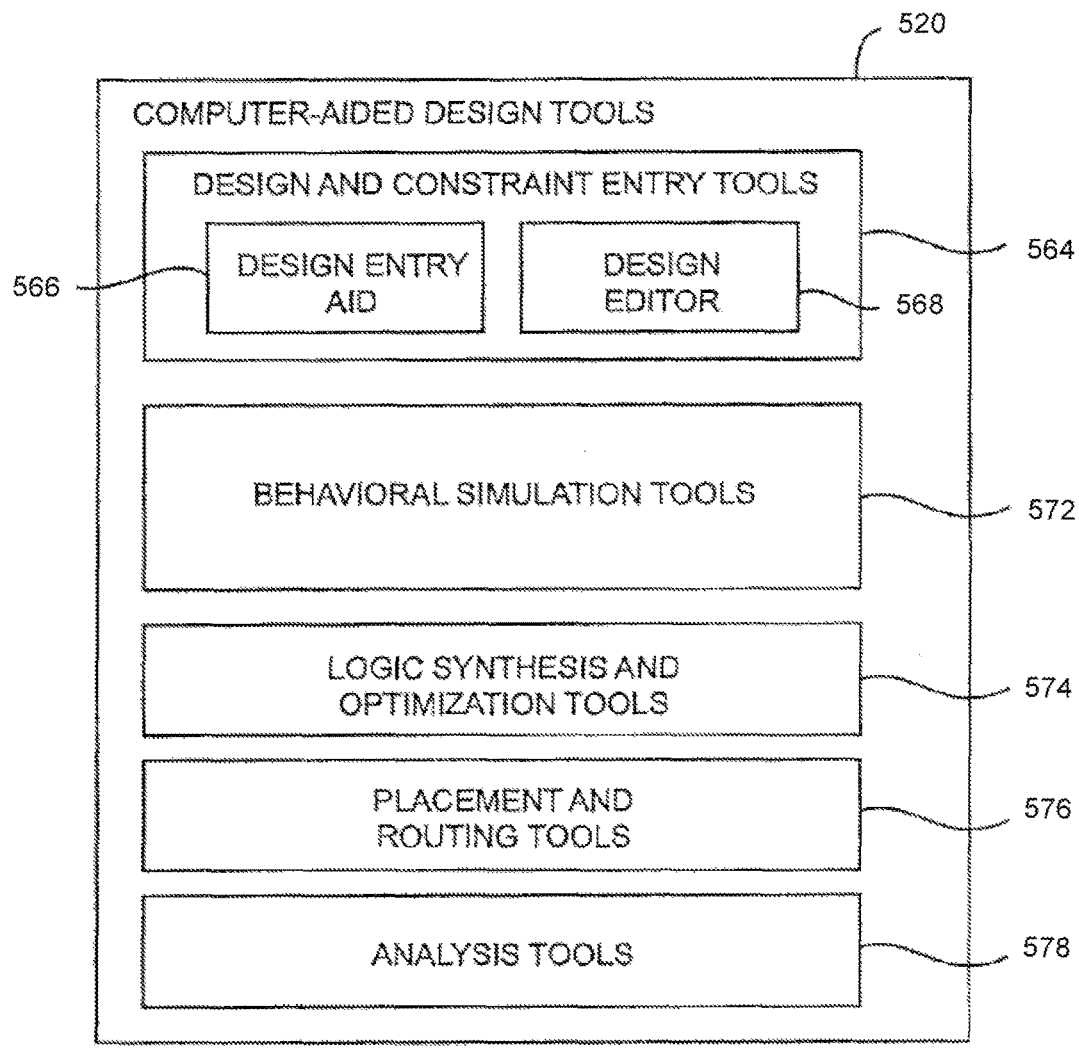
FIG. 5 is a diagram of illustrative computer-aided design (CAD) tools that may be used in a circuit design system in accordance with an embodiment.

Illustrative computer aided design tools 520 that may be used in a circuit design system such as circuit design system 400 of FIG. 4 are shown in FIG. 5.

The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a circuit design (e.g., by entering lines of hardware description language code), may be used to edit a circuit design obtained from a library (e.g., using a design and constraint entry aid), may assist a user in selecting and editing appropriate prepackaged code/designs, or may be used to perform engineering-change-orders of a previously entered circuit design.

Design and constraint entry tools 564 may be used to allow a circuit designer to provide a desired circuit design using any suitable format. For example, design and constraint entry tools 564 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 564 may allow the circuit designer to provide a circuit design to the circuit design system 400 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 568. Blocks of code may be imported from user-maintained or commercial libraries if desired.

After the design has been entered using design and constraint entry tools 564, behavioral simulation tools 572 may be used to simulate the functional performance of the circuit design. If the functional performance of the design is incomplete or incorrect, the circuit designer can make changes to the circuit design using design and constraint entry tools 564. The functional operation of the new circuit design may be verified using behavioral simulation tools 572 before synthesis operations have been performed using tools 574. Simulation tools such as behavioral simulation tools 572 may also be used at other stages in the design flow if desired (e.g., after logic synthesis). The output of the behavioral simulation tools 572 may be provided to the circuit designer in any suitable format (e.g., truth tables, timing diagrams, etc.).

Once the functional operation of the circuit design has been determined to be satisfactory, logic synthesis and optimization tools 574 may generate a gate-level netlist of the circuit design, for example using gates from a particular library pertaining to a targeted process supported by a foundry, which has been selected to produce the integrated circuit. Alternatively, logic synthesis and optimization tools 574 may generate a gate-level netlist of the circuit design using gates of a targeted programmable logic device (i.e., in the logic and interconnect resources of a particular programmable logic device product or product family).

Logic synthesis and optimization tools 574 may optimize the design by making appropriate selections of hardware to implement different logic functions in the circuit design based on the circuit design data and constraint data entered by the logic designer using tools 564. As an example, logic synthesis and optimization tools 574 may perform register retiming on the circuit design based on the length of a combinational path between registers in the circuit design and corresponding timing constraints that were entered by the logic designer using tools 564. If desired, logic synthesis and optimization tools 574 may perform all operations incrementally. For example, logic synthesis and optimization tools 574 may perform incremental register retiming based on a register retiming solution from a prior execution of logic synthesis and optimization tools 574.

After logic synthesis and optimization using tools 574, the circuit design system may use tools such as placement and routing tools 576 to perform physical design steps (layout synthesis operations). Placement and routing tools 576 are used to determine where to place each gate of the gate-level netlist produced by tools 574. For example, if two counters interact with each other, the placement and routing tools 576 may locate these counters in adjacent regions to reduce interconnect delays or to satisfy timing requirements specifying the maximum permitted interconnect delay. The placement and routing tools 576 create orderly and efficient implementations of circuit designs for any targeted integrated circuit (e.g., for a given programmable integrated circuit such as a field-programmable gate array (FPGA).)

Tools such as tools 574 and 576 may be part of a compiler suite (e.g., part of a suite of compiler tools, which are sometimes also referred to as compilation tools, provided by a programmable logic device vendor). In accordance with the present invention, tools such as tools 574, 576, and 578 may also include timing analysis tools such as timing estimators. This allows tools 574 and 576 to satisfy performance requirements (e.g., timing requirements) before actually producing the integrated circuit.

As an example, tools 574 and 576 may perform register retiming by moving registers through combinational logic (e.g., through logical AND, OR, XOR, etc. gates, look-up tables (LUTs), multiplexers, arithmetic operators, etc.). Tools 574 and 576 may push registers forward or backward across combinational logic as illustrated in FIG. 2. If desired, tools 574 and 576 may perform forward and backward pushes of registers by configuring pipelined routing resources such as pipelined routing resource 300 of FIG. 3 to operate in non-pipeline mode or as a pipelined routing element.

Consider the scenario in which tools 574 and 576 have performed a compilation of a circuit design to generate a first circuit design implementation that includes a register retiming solution. Consider further that an engineering-change-order (ECO) resulted in a limited change of the circuit design (e.g., the changes are confined to a region-of-change). In this scenario, tools 574 and 576 may perform an incremental compilation of the changed circuit design to generate a second circuit design implementation. The incremental compilation may include incremental register retiming operations, if desired. The incremental register retiming operations may be based on the limited changes of the circuit design and the register retiming solution from the first circuit design implementation. For example, the incremental register retiming operations may use the register retiming solution from the first circuit design implementation for the portions of the second circuit design implementation that are unaffected by the limited change of the circuit design.

After an implementation of the desired circuit design has been generated using placement and routing tools 576, the implementation of the design may be analyzed and tested using analysis tools 579. For example, analysis tools 578 may include timing analysis tools, power analysis tools, or formal verification tools, just to name few.

After satisfactory optimization operations have been completed using tools 520 and depending on the targeted integrated circuit technology, tools 520 may produce a mask-level layout description of the integrated circuit or configuration data for programming the programmable logic device.

Figure 6:
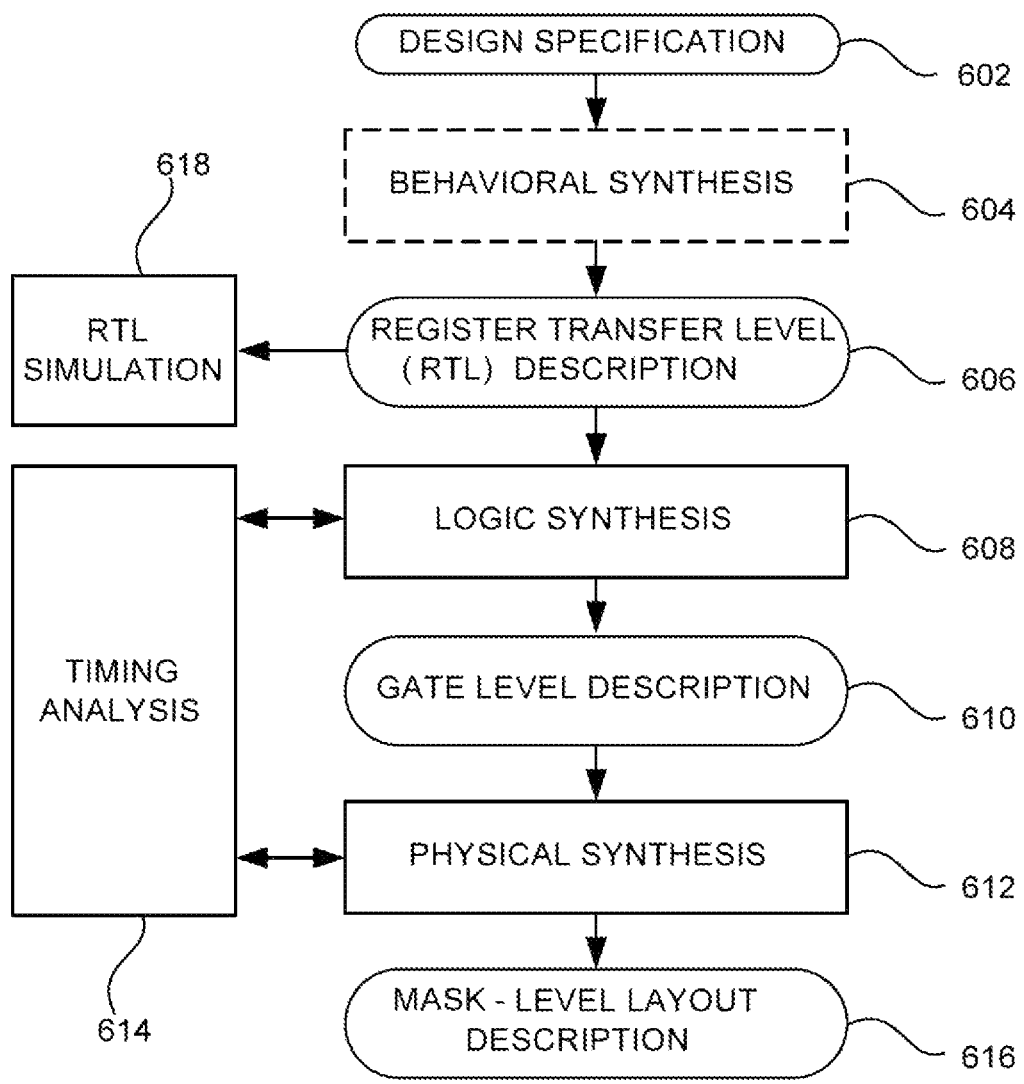
FIG. 6 is a flow chart of illustrative steps for designing an integrated circuit in accordance with an embodiment.

Illustrative operations involved in using tools 520 of FIG. 5 to produce the mask-level layout description of the integrated circuit are shown in FIG. 6. As shown in FIG. 6, a circuit designer may first provide a design specification 602. The design specification 602 may, in general, be a behavioral description provided in the form of an application code (e.g., C code, C++ code, SystemC code, OpenCL code, etc.). In some scenarios, the design specification may be provided in the form of a register transfer level (RTL) description 606.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation.

In general, the behavioral design specification 602 may include untimed or partially timed functional code (i.e., the application code does not describe cycle-by-cycle hardware behavior), whereas the RTL description 606 may include a fully timed design description that details the cycle-by-cycle behavior of the circuit at the register transfer level.

Design specification 602 or RTL description 606 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 602, the RTL description 606 (e.g., as a pragma or as an assertion), in a constraint file, or through user input (e.g., using the design and constraint entry tools 564 of FIG. 5), to name a few.

In certain embodiments, a given data path may have more than one constraint associated with the path, and some of these constraints may be in conflict with each other (e.g., a constraint received with the behavioral design specification for a given path may conflict with the constraint received with the RTL description and with a constraint received with a constraint file). In this scenario, a predetermined priority of constraints, which may be defined explicitly or resolved implicitly by CAD tools 520, may determine which of the conflicting constraints is selected. For example, the constraint from the user or a configuration file may override the constraints received from other sources, whereas a constraint received with the RTL description may override a constraint received with the behavioral design specification.

The constraints may target the entire circuit design or portions of the circuit design. For example, some constraints may be defined globally and thus be applicable to the entire circuit design. Other constraints may be assigned locally and thus be applicable only to the corresponding portions of the circuit design. Consider the scenario in which the circuit design is organized hierarchically. In this scenario, every hierarchical instance may include different assignments. In other words, multiple different constraints may target the same portion of the circuit design, and priorities may be defined explicitly or resolved implicitly by CAD tools 520. For example, a constraint defined at a higher level of the design hierarchy may override a constraint at a lower level. Alternatively, a constraint defined at a lower level of the design hierarchy may override a constraint at a higher level, or individual levels of the design hierarchy may be given priority over other levels of design hierarchy.

Constraints included in design specification 602 or RTL description 606 may be conveyed to CAD tools 520 in the form of variables, parameters, compiler directives, macros, pragmas, or assertions, just to name a few. CAD tools 520 may use a constraint file, which may include a portion or all of the constraints. Such a constraint file may be included with design specification 602 or RTL description 606. In some scenarios, a portion or all of the constraints may be embedded in the circuit design. Alternatively, the constraints may have been defined using the design and constraint entry tools 564 (see FIG. 5).

At step 604, behavioral synthesis (sometimes also referred to as algorithmic synthesis) may be performed to convert the behavioral description into an RTL description 606. Step 604 may be skipped if the design specification is already provided in form of an RTL description.

At step 618, behavioral simulation tools 572 may perform an RTL simulation of the RTL description, which may verify the functional performance of the RTL description. If the functional performance of the RTL description is incomplete or incorrect, the circuit designer can make changes to the HDL code (as an example). During RTL simulation 618, actual results obtained from simulating the behavior of the RTL description may be compared with expected results.

During step 608, logic synthesis operations may generate gate-level description 610 using logic synthesis and optimization tools 574 from FIG. 5. If desired, logic synthesis operations may perform register retiming as illustrated in FIG. 2 according to the constraints that are included in design specification 602 or RTL description 606. If desired, after an initial execution of logic synthesis operations 608, subsequent executions of logic synthesis operations 608 may execute incremental register retiming (e.g., after an ECO in the RTL description 606).

During step 612, physical synthesis operations (e.g., place and route and optimization operations using for example placement and routing tools 576) may place and connect the different gates in gate-level description 610 in a preferred location on the targeted integrated circuit to meet given target criteria (e.g., minimize area and maximize routing efficiency or minimize path delay and maximize clock frequency or any combination thereof).

If desired, physical synthesis operations may perform register retiming as illustrated in FIG. 2 and according to the constraints that are included in design specification 602 or RTL description 606. As an example, physical synthesis operations may perform register retiming after placement and routing operations by changing the configuration of some pipelined routing resources (e.g., some instances of pipelined routing resource 300 of FIG. 3) from operating in pipeline register mode to operating in non-pipelined mode and the configuration of other pipelined routing resources (e.g., other instances of pipelined routing resources 300 of FIG. 3) from operating in non-pipelined mode to operating in pipeline register mode. The output of physical synthesis 612 is a mask-level layout description 616.

If desired, after an initial execution of physical synthesis operations 612, subsequent executions of physical synthesis operations 612 may perform incremental register retiming (e.g., after an ECO in the gate level description 610 or after an ECO in the RTL description 606 resulted in an update of the gate level description 610).

Circuit design system 400 (FIG. 4) may include a timing estimator (e.g., formed as part of optimization tools 574, tools 576, or tools 578) that may be used to generate timing information for paths between synchronous elements of the circuit design during step 614. For example, timing estimator may generate timing information for paths between sequential elements such as registers and storage circuits (e.g., based on the lengths of interconnects, intermediate combinational logic, etc.). The timing information may, if desired, be estimated based on metrics such as delays, slack (e.g., the difference between a required arrival time and the actual arrival time of a signal), slack-ratios, interconnect congestion, or other timing metrics. Circuit design system 400 may use the estimated delays to determine the locations of groups of circuitry while helping to ensure that delays satisfy timing requirements (e.g., critical path delay requirements) or other performance constraints.

Consider the scenario in which a circuit design has a given path from a register through combinational logic to another register and that this given path misses one or more target criteria. For example, the timing estimator may determine that the given path is associated with a delay that is larger than the target delay specified for the path as one of the target criteria. The timing estimator may detect that the given path has a larger delay before, during, and after logic synthesis 608 or before, during, and after physical synthesis 612, which may include operations such as clustering, partitioning, placement, and routing, just to name a few. In this scenario, logic synthesis 608 or physical synthesis 612 may perform register retiming, thereby reducing the delay through the combinational logic between the registers and potentially improving the performance of the given path.

If desired, the timing estimator may preserve timing information during step 614 that are generated during a first circuit design implementation. In the event of an ECO, subsequent operations involved in the implementation of the changed circuit design may use incremental timing analysis during step 614.

As an example, the timing estimator may use a timing graph to determine timing information in the first circuit design implementation. During incremental timing analysis, the timing estimator may determine which portions of the timing graph are affected by the ECO and which portions are not affected. If desired, incremental timing analysis may preserve the portions of the timing graph that are not affected by the ECO and remove and regenerate the portions of the timing graph that are affected. If desired, incremental timing analysis may preserve the timing analysis results (e.g., delays, slacks, slack ratios, etc.) of the first circuit design implementation for the portions of the changed circuit design that are not affected by the ECO and regenerate the timing analysis results for the portions of the circuit design that are affected by the ECO.

Figure 7:
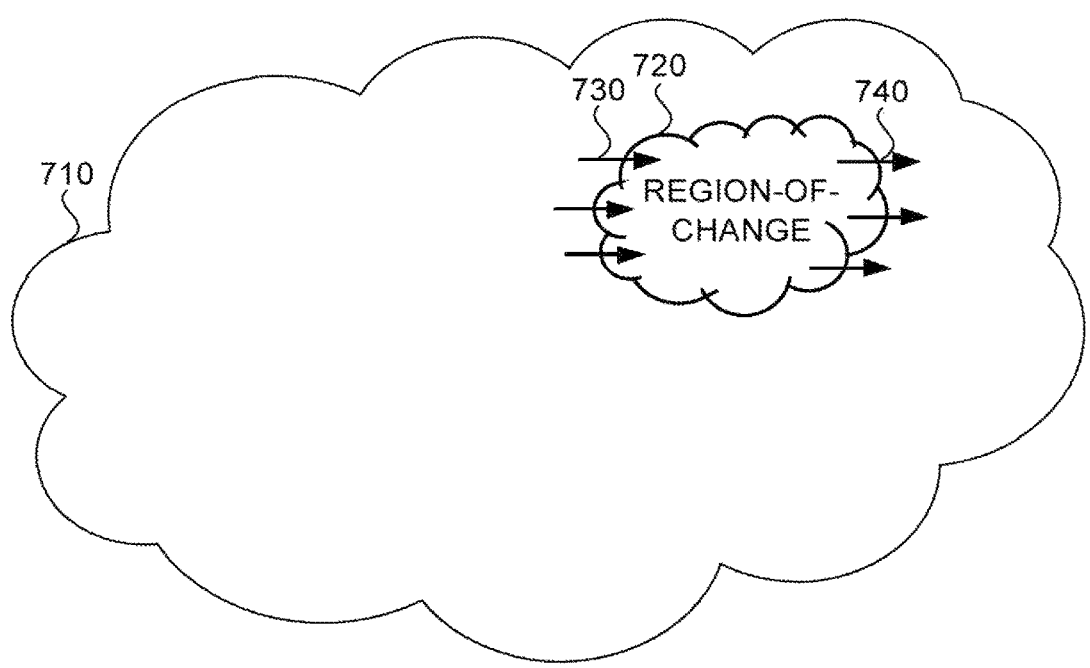
FIG. 7 is a diagram of an illustrative circuit design with a region-of-change in accordance with an embodiment.

As an example of an ECO, consider the circuit design 710 of FIG. 7, which may be in the form of design specification 602, RTL description 606, or gate level description 610.

Consider the scenario in which tools 574 and 576 have performed a first compilation of circuit design 710 to generate a first circuit design implementation that is at least partially generated as a result of a register retiming operation. Consider further that the ECO causes an update of a portion of circuit design 710. This portion of circuit design 710 may be limited to region-of-change 720.

Region-of-change 720 may have inputs 730 and outputs 740 that may couple elements (e.g., logic gates, look-up tables (LUTs), arithmetic operators, storage circuitry, interface circuitry, clocking circuitry, etc.) inside region-of-change 720 with elements outside region-of-change 720. If desired, inputs 730 and/or outputs 740 may couple elements inside region-of-change 720 with pins of circuit design 710.

In this scenario, tools 574 and 576 may perform an incremental compilation of the changed circuit design to generate a second circuit design implementation. The incremental compilation may include incremental register retiming operations, if desired. The incremental register retiming operations may be based on the limited changes of the circuit design and the result of the register retiming operation from the first circuit design implementation.

For example, the incremental register retiming operations may use the result of the register retiming operation from the first circuit design implementation for the portions of the second circuit design implementation that are unaffected by the limited change of the circuit design. In other words, any portion of the second circuit design implementation that is not directly connected to an element in the region-of-change may have the same placement, routing, and register retiming as in the first circuit design implementation.

In some embodiments, the incremental compilation may expand the region-of-change until reaching a register boundary. Thus, the incremental compilation may consider some combinational logic blocks outside the region-of-change, even though those combinational logic blocks are not affected by the ECO and have not changed from the first circuit design implementation.

Registers that are part of the register boundary are sometimes also referred to as synchronization registers. If desired, the synchronization registers may maintain the assigned placement from the first circuit design implementation during the second circuit design implementation. In other words, the incremental register retiming operation may not move a synchronization register.

In the example of FIG. 7, the elements in circuit design 710 that are not directly connected to inputs 730 or outputs 740 of region-of-change 720 may have the same placement, routing, and register retiming in the second circuit design implementation as in the first circuit design implementation. However, any element in region-of-change 720 may require a different placement and/or routing. As a result, any element in region-of-change 720 or directly connected to region-of-change 720 may require a different register retiming operation to be performed from the first circuit design implementation.

Register retiming operations may represent node dependencies and/or constraints graphically, for example using a dependency graph and/or a constraint graph and solve the register retiming problem using these graphs. As an example, the incremental register retiming operation may incrementally update the dependency graph and/or the constraint graph from the result of the register retiming operation of the first circuit design implementation.

Figure 8:
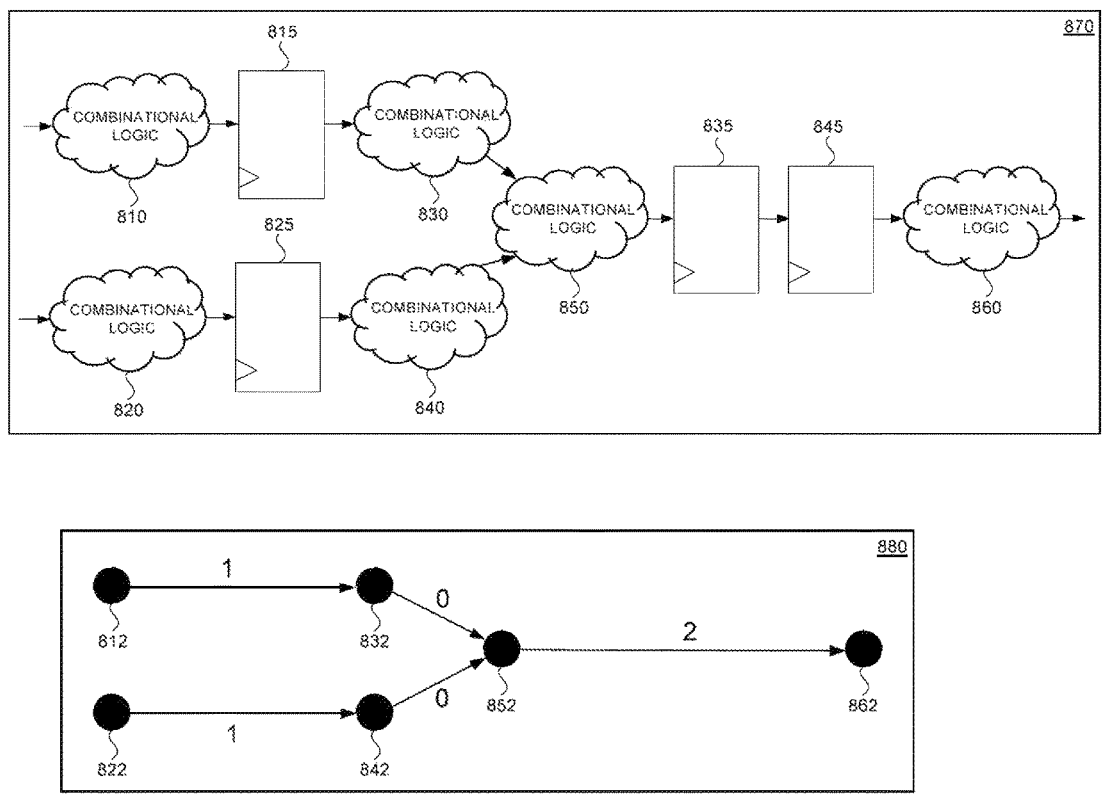
FIG. 8 is a diagram of an illustrative circuit design and an illustrative dependency graph that represents the circuit design in accordance with an embodiment.

FIG. 8 shows an illustrative circuit design 870 and an illustrative dependency graph 880 that represents the circuit design. Circuit design 870 may include registers 815, 825, 835, and 845, and combinational logic 810, 820, 830, 840, 850, and 860. The corresponding dependency graph 880 may include a node for every combinational logic block in the circuit design. For example, nodes 812, 822, 832, 842, 852, and 862 of dependency graph 880 may represent combinational blocks 810, 820, 830, 840, 850, and 860 of circuit design 870, respectively.

Dependency graph 880 may include an arc, which is sometimes also referred to as a "directed edge" or simply an edge, between each pair of nodes for a corresponding connection between a pair of combinational logic blocks in the circuit design. For example, an arc from node 812 to 832 in the dependency graph may represent the connection between combinational logic 810 and 830 in the circuit design. Similarly, an arc from node 822 to node 842, from node 832 to node 852, from node 842 to node 852, and from node 852 to node 862 may represent connections between combinational logic 820 and 840, between combinational logic 830 and 850, between combinational logic 840 and 850, and between combinational logic 850 and 860, respectively.

Each arc in the dependency graph may have a weight that indicates the number of registers between the combinational logic blocks in the circuit design. For example, the weight "1" on the arc from node 812 to node 832 of dependency graph 880 may represent register 815 on the connection from combinational logic 810 to 830. The weights on the remaining arcs may be determined in the same way.

Consider for example, that an ECO of a first circuit design implementation results in a region-of-change (e.g., region-of-change 720 of FIG. 7) that includes registers 815, 825, 835, and 845, and combinational logic 830, 840, and 850. Consider further that combinational logic 810, 820, and 860 are outside the region-of-change. Thus, the connections from combinational logic 810 and 820 to registers 815 and 825, respectively, represent the inputs to the region-of-change (e.g., inputs 730 of FIG. 7); and the connection from register 845 to combinational logic 860 represents the output of the region-of-change (e.g., outputs 740 of FIG. 7).

In this example, the incremental register retiming operation may identify the nodes in the dependency graph from the first circuit design implementation (i.e., nodes 812, 822, and 862), delete all nodes and edges from the dependency graph that lie within the region-of-change, and preserve nodes and edges (or transitions) between nodes that lie outside the region-of-change. The incremental register retiming operation may then incrementally rebuild the dependency graph by introducing elements from the region-of-change into the dependency graph. For example, the incremental register retiming operation may perform a breadth-first search (BFS) or a depth-first search (DFS) starting from the inputs of the region-of-change. Alternatively, the incremental register retiming operation may perform a BFS or a DFS starting from the outputs of the region-of-change.

As an example, the incremental register retiming operation may start in combinational logic 810 and search forward. The incremental register retiming operation may add node 832 to the dependency graph upon reaching combinational logic 830 and connect node 832 with an arc from node 812 that has a weight "1" caused by register 815. The incremental register retiming operation may then start in combinational logic 820 and search forward. In other words, the incremental register retiming operation is performing a BFS from the inputs of the region-of-change towards the output of the region of change. The incremental register retiming operation may add node 842 to the dependency graph upon reaching combinational logic 840 and connect node 842 with an arc from node 812 that has a weight "1" caused by register 925.

The incremental register retiming operation may continue with searching forward from combinational logic 830. The incremental register retiming operation may add node 852 to the dependency graph upon reaching combinational logic 850 and connect node 852 with an arc from node 842 that has a weight "0", because there is no register between combinational nodes 830 and 850. The incremental register retiming operation may then search forward from combinational logic 840 and reach combinational node 850. The incremental register retiming operation may recognize that combinational logic 850 is already represented by node 852 and connect node 852 with an arc from node 842 that has a weight "0", because there is no register between combinational nodes 840 and 850.

The incremental register retiming operation may continue with searching forward, recognize that combinational logic 860 is already represented by node 862 upon reaching combinational logic 860 and connect node 862 with an arc from node 852 that has a weight "2" caused by registers 835 and 845.

If desired, the incremental register retiming operation may identify the nodes in the constraint graph from the first circuit design implementation (i.e., nodes 812, 822, and 862), delete all nodes and edges from the constraint graph that lie within the region-of-change, and preserve nodes and edges (or transitions) between nodes that lie outside the region-of-change. The incremental register retiming operation may then incrementally rebuild the constraint graph by incrementally adding constraints from the region-of-change into the constraint graph. If desired, the incremental register retiming operation may invalidate constraints related to paths between elements outside the region-of-change and elements inside the region-of-change. The incremental register retiming operation may then generate new constraints for those paths and replace the invalidated constraints with the new constraints.

An example of constraints that may be added to a constraint graph from a prior circuit design implementation and the resulting constraints graph 980 is shown in FIG. 9.

The incremental register retiming operation may incrementally build the constraint graph by adding the nodes and edges from the dependency graph that are affected by the ECO (i.e., nodes 812, 822, 832, 842, 852, and 862 of dependency graph 880 and the corresponding edges) to constraint graph 980 and label the nodes A, B, C, D, E, and F, respectively. The incremental register retiming operation may also add host node 910, which may have the label H, and connect every node in the constraint graph with an arc of weight "0" from the host node.

In some embodiments, the incremental register retiming operation may enumerate the new constraints for the region-of-change. If desired, the incremental register retiming operation may distinguish basic constraints, which ensure a non-negative number of registers on an arc, timing constraints (e.g., from performing timing analysis 614 of FIG. 6) and architecture constraints, which may limit register retiming to the number of available registers (e.g., the number of routing registers or pipelined routing resources) on any connection between nodes.

As an example, consider that the weight of an arc from a node node1 to a node node2 before and after the incremental register retiming operation is denoted by w(node1, node2) and w_ret(node1, node2), respectively, and that pushing a register forward across a node node2 is denoted by r(node2). Consider further the scenario of circuit design 870 of FIG. 8 with nodes 812, 822, and 862 being outside the region-of-change and with the arc from node A to node C having a weight of one (i.e., w(A,C)=1), the arc from node B to node D having a weight of one (i.e., w(B,D)=1), the arc from node C to node E having a weight of zero (i.e., w(C,E)=0), the arc from node D to node E having a weight of zero (i.e., w(D,E)=0), and the arc from node E to node F having a weight of two (i.e., w(E,F)=2) before the incremental register retiming operation.

After the incremental register retiming operation, the weight of the arc from node A to node C (i.e., w_ret(A,C)) is defined as the weight of the arc from node A to node C before retiming (i.e., w(A,C)) plus the number of registers pushed forward through node A (i.e., r(A)) minus the number of registers pushed forward through node C (i.e., r(C)):

$$w\_ret(A,C)=w(A,C)+r(A)-r(C) \quad (1)$$

The remaining weights of the arcs after the incremental register retiming operation are determined similarly:

$$w\_ret(B,D)=w(B,D)+r(B)-r(D) \quad (2)$$

$$w\_ret(C,E)=w(C,E)+r(C)-r(E) \quad (3)$$

$$w\_ret(D,E)=w(D,E)+r(D)-r(E) \quad (4)$$

$$w\_ret(E,F)=w(E,F)+r(E)-r(F) \quad (5)$$

The basic constraints may ensure that no arc has a negative number of registers after incremental register retiming. In other words, every equation (1)-(5) must be greater than or equal to zero:

$$w\_ret(A,C)>=0 \quad (6)$$

$$w\_ret(B,D)>=0 \quad (7)$$

$$w\_ret(C,E)>=0 \quad (8)$$

$$w\_ret(D,E)>=0 \quad (9)$$

$$w\_ret(E,F)>=0 \quad (10)$$

Substituting the respective weights after incremental register retiming operations in inequalities (6) to (10) with equations (1) to (5) and introducing the values for the weights before incremental register retiming operations in the exemplary scenario described above leads to:

$$r(C)-r(A)<=1 \quad (11)$$

$$r(D)-r(B)<=1 \quad (12)$$

$$r(E)-r(C)<=0 \quad (13)$$

$$r(E)-r(D)<=0 \quad (14)$$

$$r(F)-r(E)<=2 \quad (15)$$

The incremental register retiming operation may represent inequalities (11) to (15) in constraint graph 980 by an arc from node A to node C of weight one, an arc from node B to node D of weight one, an arc from node C to node E of weight zero, an arc from node D to node E of weight zero, and an arc from node E to node F of weight two, respectively.

The incremental register retiming operation may determine timing constraints, for example by performing timing analysis 614 of FIG. 6. As an example, timing analysis may determine that in order to meet timing, the paths from combinational logic 830 to combinational logic 850 and from combinational logic 840 to combinational logic 850 of FIG. 5 may require at least one register.

Thus, after incremental register retiming operations, there must be at least one register between nodes C and E and at least one register between nodes D and E. In other words, equations (3) and (4) must be greater than or equal to one:

$$w\_ret(C,E) >= 1 \quad (16)$$

$$w\_ret(D,E) >= 1 \quad (17)$$

Substituting the respective weights after incremental register retiming operations in inequalities (16) and (17) with equations (3) and (4) and introducing the values for the weights before incremental register retiming operations leads to:

$$r(E)-r(C) <= -1 \quad (18)$$

$$r(E)-r(D) <= -1 \quad (19)$$

The incremental register retiming operation may represent inequalities (18) and (19) in constraint graph 980 by an arc from node C to node E of weight minus one and an arc from node D to node E of weight minus one, respectively.

The incremental register retiming operation may determine architecture constraints based on the number of available registers (e.g., the number of routing registers or pipelined routing resources) on any connection between nodes. As an example, circuit design 870 of FIG. 8 may have less than or equal to one available register between any connected circuit element of circuit design 870. In other words, there may be one or less registers between combinational logic 810 and 830, between combinational logic 820 and 840, between combinational logic 830 and 850, between combinational logic 840 and 850, and between combinational logic 850 and 860 of circuit design 870 of FIG. 8.

Thus, after incremental register retiming operations, every equation (1)-(5) must be less than or equal to one:

$$w\_ret(A,C) <= 1 \quad (20)$$

$$w\_ret(B,D) <= 1 \quad (21)$$

$$w\_ret(C,E) <= 1 \quad (22)$$

$$w\_ret(D,E) <= 1 \quad (23)$$

$$w\_ret(E,F) <= 1 \quad (24)$$

Substituting the respective weights after incremental register retiming operations in inequalities (20) to (24) with equations (1) to (5) and introducing the values for the weights before incremental register retiming operations leads to:

$$r(A)-r(C) <= 0 \quad (25)$$

$$r(B)-r(D) <= 0 \quad (26)$$

$$r(C)-r(E) <= 1 \quad (27)$$

$$r(D)-r(E) <= 1 \quad (28)$$

$$r(E)-r(F) <= -1 \quad (29)$$

The incremental register retiming operation may represent inequalities (25) to (29) in constraint graph 980 by an arc from node C to node A of weight zero, an arc from node D to node B of weight zero, an arc from node E to node C of weight one, an arc from node E to node D of weight one, and an arc from node F to node E of weight minus one, respectively.

The incremental register retiming operation may solve the system of inequalities by using a shortest path algorithm on the constraint graph. In some embodiments, the incremental register retiming operation may use the Bellman-Ford algorithm for solving the single-source shortest path problem when edge weights may be negative and choosing host node 910, which is sometimes also referred to as "source node", as the origin of the constraint graph. The system of inequalities may have a solution (i.e., all constraints can be met simultaneously) if and only if the constraint graph contains no negative cycles.

If a solution to the inequalities exists, the incremental register retiming operation may determine the solution by representing the constraints as an integer linear programming (ILP) problem, if desired. As an example, the incremental register retiming operation may use the simplex method to solve the ILP problem. As a result, the incremental register retiming operation may move register 835 from the output of combinational logic 850 to both inputs of combinational logic 850 of circuit design 870 of FIG. 8.

Figure 10:
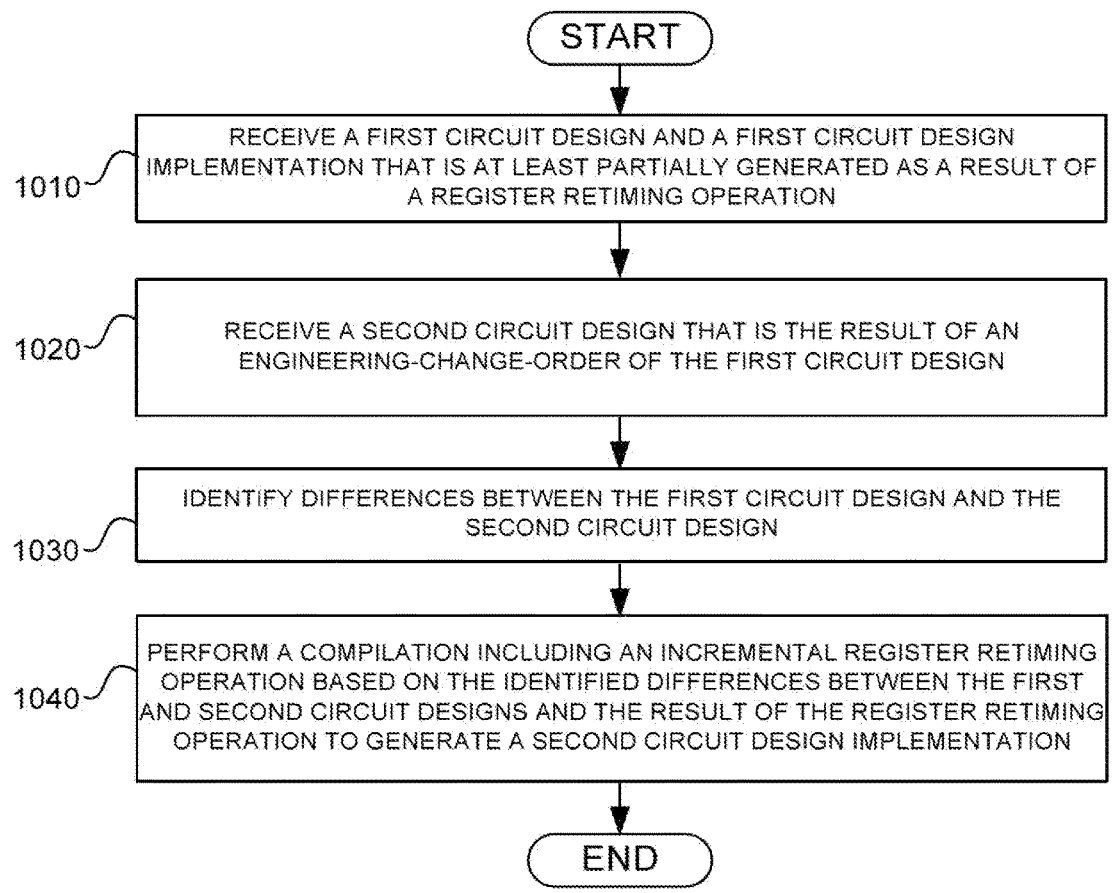
FIG. 10 is a diagram of illustrative steps for operating circuit design computing equipment in accordance with an embodiment.

FIG. 10 is a diagram of illustrative steps for operating circuit design computing equipment in accordance with an embodiment. During step 1010, the circuit design computing equipment may receive a first circuit design (e.g., circuit design 710 of FIG. 7 without region-of-change 720) and a first circuit design implementation that is at least partially generated as a result of a register retiming operation. During step 1020, the circuit design computing equipment may receive a second circuit design (e.g., circuit design 710 of FIG. 7 with region-of-change 720) that is the result of an engineering-change-order (ECO) of the first circuit design. For example, a register pipelining operation after a routing operation may have inserted additional registers into the first circuit design to create the second circuit design.

During step 1030, the circuit design computing equipment may identify differences between the first circuit design and the second circuit design. For example, the circuit design computing equipment may compare the gate-level netlist of the first circuit design implementation with the gate-level netlist of the second circuit design implementation to determine a region-of-change. For example, the circuit design computing equipment may identify region-of-change 720 of FIG. 7 as including all the differences between circuit design 710 without region-of-change 720 and circuit design 710 with region-of-change 720.

During step 1040, the circuit design computing equipment may perform a compilation including an incremental register retiming operation based on the identified differences between the first and second circuit designs and the result of the register retiming operation to generate a second circuit design implementation. For example, if desired, the incremental register retiming operation may incrementally update the dependency graph such as dependency graph 880 of FIG. 8 and the constraint graph such as constraint graph 980 of FIG. 9 for the circuit design portion inside a region-of-change (e.g., region-of-change 720 of FIG. 7).

Figure 11:
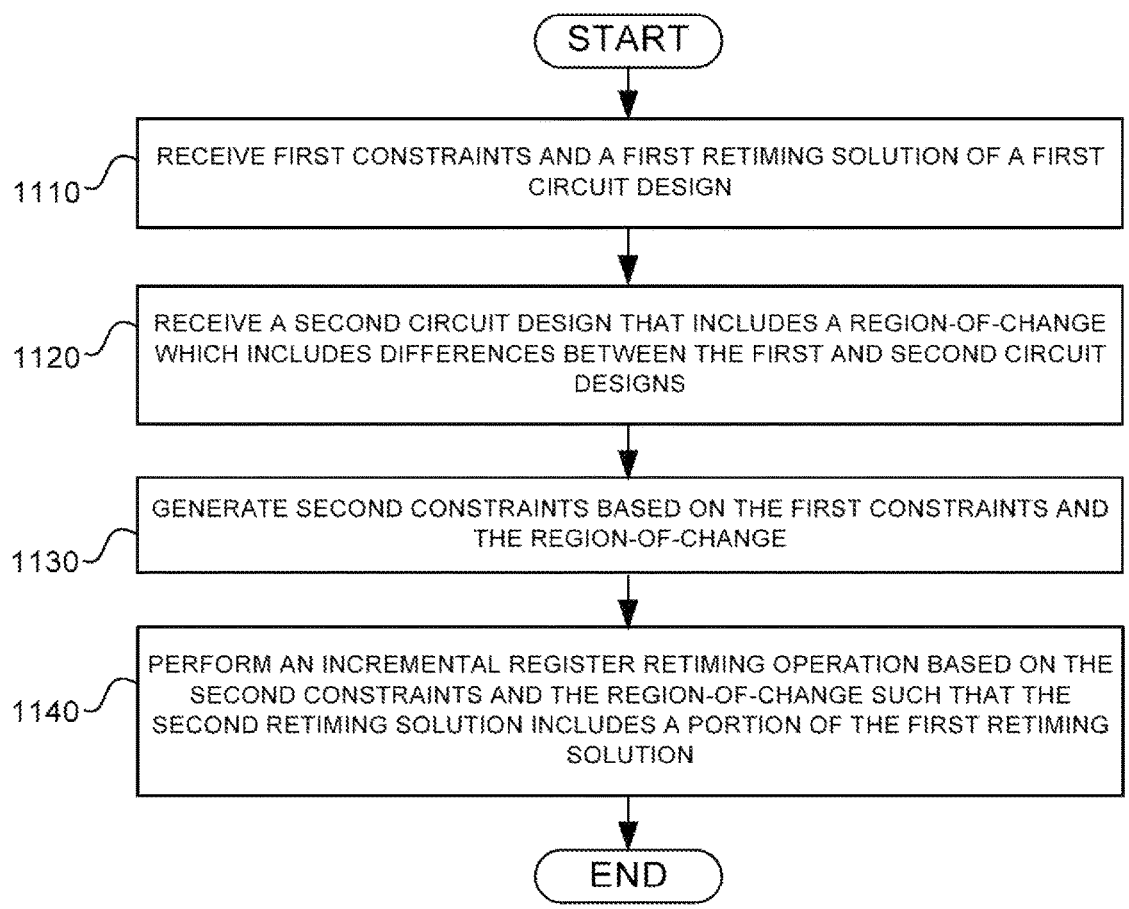
FIG. 11 is a diagram of illustrative steps for operating a circuit design tool implemented on computing equipment in accordance with an embodiment.

FIG. 11 is a diagram of illustrative steps for operating a circuit design tool implemented on computing equipment in accordance with an embodiment. During step 1110, the circuit design tool may receive first constraints and a first retiming solution of a first circuit design (e.g., circuit design 710 of FIG. 7 without region-of-change 720).

During step 1120, the circuit design tool may receive a second circuit design that includes a region-of-change (e.g., circuit design 710 of FIG. 7 with region-of-change 720), which includes differences between the first and second circuit designs. During step 1130, the circuit design tool may generate constraints based on the first constraints and the region-of-change (e.g., the constraints illustrated in FIG. 8 for circuit design 870), and during step 1140, the circuit design tool may perform an incremental register retiming operation (e.g., by moving register 835 of FIG. 8 from the output of combinational logic 850 to the input of combinational logic 850) based on the second constraints and the region-of-change such that the second retiming solution includes a portion of the first retiming solution.

For example, if desired, the circuit design tool may re-use any portion of the first retiming solution that is outside of the region-of-change.

Figure 12:
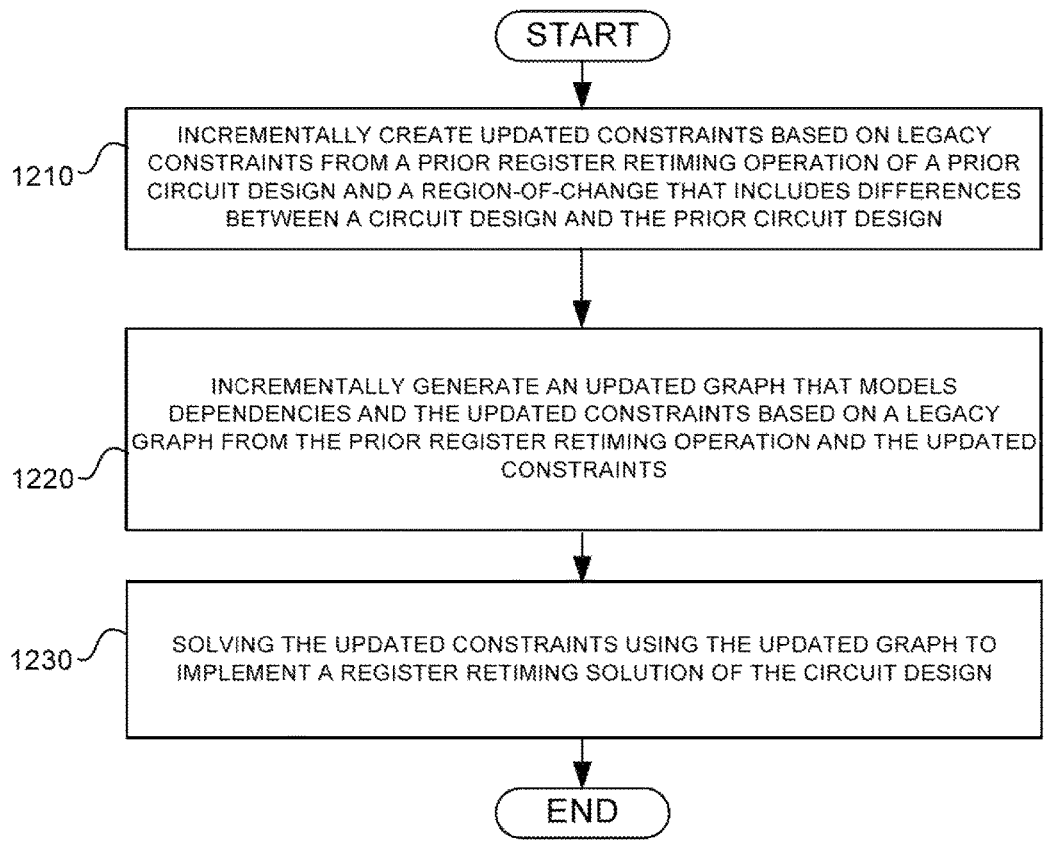
FIG. 12 is a diagram of illustrative steps for performing an incremental register retiming operation of a circuit design in accordance with an embodiment.

FIG. 12 is a diagram of illustrative steps for performing an incremental register retiming operation of a circuit design in accordance with an embodiment. During step 1210, the incremental register retiming operation may incrementally create updated constraints based on legacy constraints form a prior register retiming operation of a prior circuit design and a region-of-change that includes differences between a circuit design and the prior circuit design. For example, the incremental register retiming operation may use the legacy constraints from a register retiming operation performed on circuit design 710 of FIG. 7 without region-of-change 720 and incrementally create update constraints by changing, adding, and/or removing constraints caused by region-of-change 720.

During step 1220, the incremental register retiming operation may incrementally generate an updated graph that models dependencies and the updated constraints based on a legacy graph from the prior register retiming operation and the updated constraints. For example, the incremental register retiming operation may use the legacy graph from the register retiming operation performed on circuit design 710 of FIG. 7 without region-of-change 720 and incrementally generate an updated graph by changing, adding, and/or removing nodes and arcs in the legacy graph according to the updated constraints caused by region-of-change 720.

During step 1230, the incremental register retiming operation may solve the updated constraints using the updated graph to implement a register retiming solution of the circuit design. For example, the incremental register retiming operation may solve the updated constraints as illustrated in FIG. 9 by using a shortest path algorithm on constraint graph 980.

Figure 13:
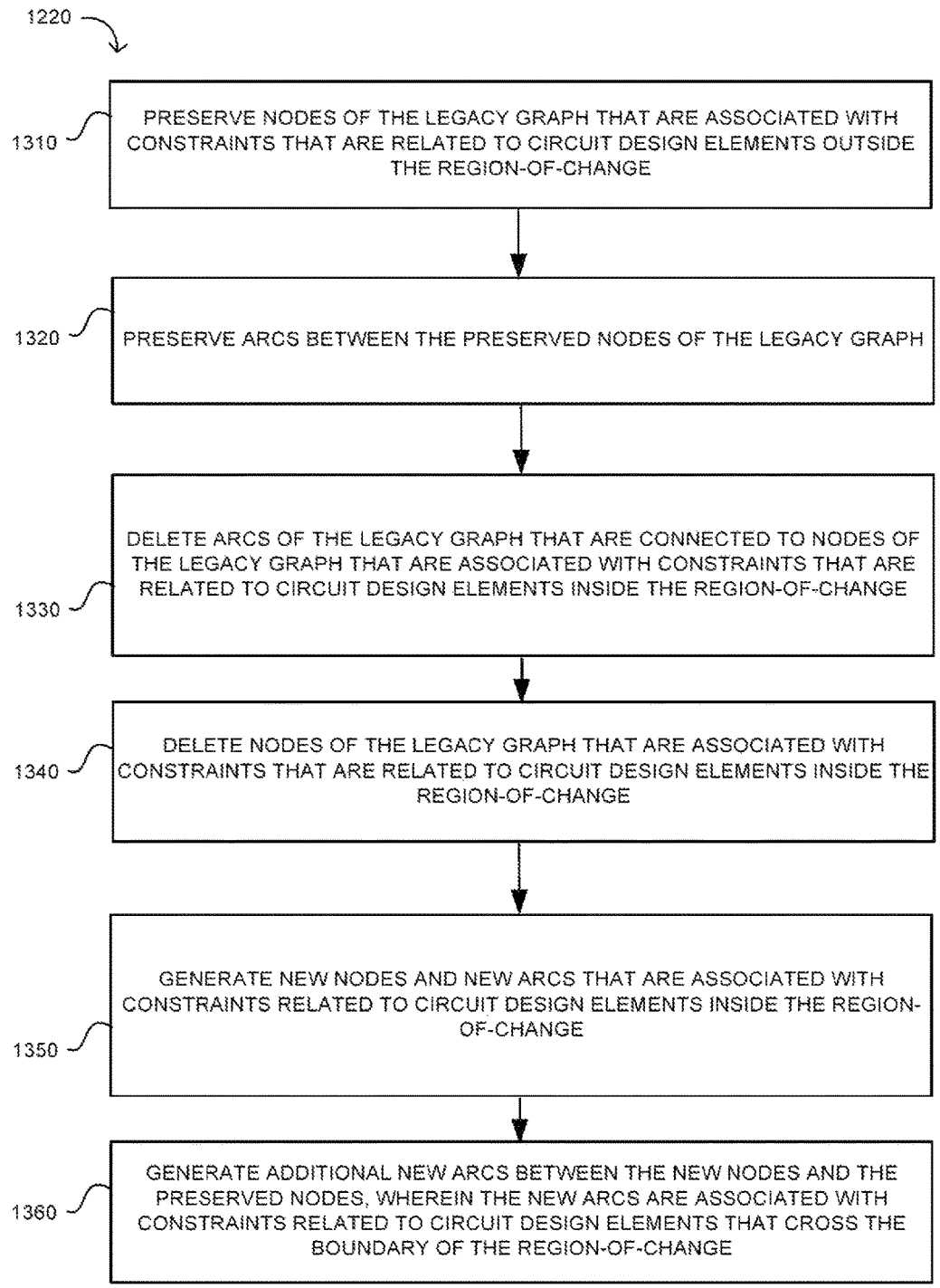
FIG. 13 is a diagram of illustrative steps for incrementally generating an updated dependency graph and the updated constraints based on a legacy graph in accordance with an embodiment.

FIG. 13 is a diagram of illustrative steps for incrementally generating an updated dependency graph and the updated constraints based on a legacy graph as shown in step 1220 of FIG. 12 in accordance with an embodiment.

During step 1310, the incremental register retiming operation may preserve nodes of the legacy graph that are associated with constraints that are related to circuit design elements outside the region-of-change and may preserve arcs between the preserved nodes of the legacy graph during step 1320.

During step 1330, the incremental register retiming operation may delete arcs of the legacy graph that are connected to nodes of the legacy graph that are associated with constraints that are related to circuit design elements inside the region-of-change and may delete nodes of the legacy graph that are associated with constraints that are related to circuit design elements inside the region-of-change during step 1340.

During step 1350, the incremental register retiming operation may generate new nodes and new arcs that are associated with constraints related to circuit design elements inside the region-of-change. During step 1360, the incremental register retiming operation may generate additional new arcs between the new nodes and the preserved nodes, wherein the new arcs are associated with constraints related to circuit design elements that cross the boundary of the region-of-change.

The methods and apparatuses described herein may be incorporated into any suitable electronic device or system of electronic devices. For example, the methods and apparatuses may be incorporated into numerous types of devices such as microprocessors or other ICs. Exemplary ICs include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), digital signal processors (DSPs), graphics processing units (GPUs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of performing incremental register retiming operations is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented in any suitable combination.

What is claimed is:

1. A method for operating circuit design computing equipment, comprising:
   with the circuit design computing equipment, receiving a first circuit design and a first circuit design implementation that is at least partially generated as a result of a register retiming operation on the first circuit design;
   with the circuit design computing equipment, receiving a second circuit design that is the result of an engineering-change-order of the first circuit design;
   with the circuit design computing equipment, identifying differences between the first circuit design and the second circuit design;
   with the circuit design computing equipment, performing a compilation of the second circuit design to generate a second circuit design implementation, wherein the compilation involves performing an incremental register retiming operation that is based on the identified differences between the first and second circuit designs and the first circuit design implementation, and wherein performing the incremental register retiming operation comprises:
      moving a register across a combinational node within the second circuit design; and
   generating configuration data for configuring an integrated circuit based on the second circuit design implementation.

2. The method of claim 1, wherein identifying differences between the first circuit design and the second circuit design comprises:
- identifying a first region of the first circuit design that has a predetermined functionality; and
- identifying a second region of the second circuit design that has the same predetermined functionality.

3. The method of claim 2, further comprising:
- identifying a third region of the first circuit design that is coupled to the first region; and
- identifying a fourth region of the second circuit design that is coupled to the second region.

4. The method of claim 3, wherein performing the incremental register retiming operation further comprises:
- moving registers between the fourth region and a sub-region of the first region.

5. The method of claim 3, wherein moving the register across the combinational node within the second circuit design comprises:
- moving the register across the combinational node within the fourth region.

6. The method of claim 5, wherein moving the register across the combinational node further comprises:
- enabling a first register in a first routing resource that is connected to the combinational node; and
- disabling a second register in a second routing resource that is connected to the combinational node and that is different from the first routing resource.

7. The method of claim 3, wherein performing the compilation further comprises:
- preserving a portion of the first circuit design implementation, wherein the portion implements at least a sub-region of the first region in the second circuit design implementation.

8. The method of claim 7, wherein performing the incremental register retiming operation further comprises:
- preserving timing constraints in the portion of the first circuit design implementation.

9. The method of claim 8, further comprising:
- generating additional timing constraints in the fourth region.

10. The method of claim 2, wherein performing the compilation further comprises:
- preserving a portion of the first circuit design implementation, wherein the portion implements at least a sub-region of the first region in the second circuit design implementation, and wherein performing the incremental register retiming operation further comprises:
- preserving timing constraints in the portion of the first circuit design implementation.

11. The method defined in claim 1, wherein performing the incremental register retiming operation comprises:
- incrementally updating a dependency graph associated with the second circuit design.

12. The method defined in claim 11, wherein performing the incremental register retiming operation further comprises:
- incrementally updating a constraint graph associated with the second circuit design.

13. The method defined in claim 1, wherein performing the incremental register retiming operation comprises:
- incrementally updating a constraint graph associated with the second circuit design.

\* \* \* \* \*